United States Patent

Igeta et al.

[11] Patent Number: 6,121,735
[45] Date of Patent: Sep. 19, 2000

[54] ACTUATOR WITH START-STOP OPERATION

[76] Inventors: Tamotsu Igeta, 2-26, 2-Chome, Koyata, Iruma-shi, Saitama, 358; Hideaki Uchino, 3-1-508, 1-Chome, Tamagawacho, Akishima-shi, Tokyo, 196; Ken-ichi Shimizu, 17-1-24-502, Chome, Fiko,odao, Kunitachi-shi, Tokyo, 185, all of Japan

[21] Appl. No.: 08/694,372

[22] Filed: Aug. 8, 1996

Related U.S. Application Data

[63] Continuation-in-part of application No. 08/402,039, Mar. 10, 1995, abandoned.

[30] Foreign Application Priority Data

Mar. 10, 1994 [JP] Japan .......................... 6-40169

[51] Int. Cl.⁷ ...................................................... H02P 1/54
[52] U.S. Cl. .......................... 318/101; 318/35; 318/112; 318/625; 318/466
[58] Field of Search ............... 318/34–112, 625, 318/445, 452, 466, 470

[56] References Cited

U.S. PATENT DOCUMENTS

| | | | |
|---|---|---|---|
| 5,285,757 | 2/1994 | Entenmann et al. | 123/399 |
| 5,298,845 | 3/1994 | DeBoer et al. | 318/609 |
| 5,420,485 | 5/1995 | Campbell | 318/34 |

*Primary Examiner*—David Martin
*Attorney, Agent, or Firm*—Hoffman, Wasson & Gitler, PC

[57] ABSTRACT

The present invention relates to an electronically adjustable actuator for actuating a plurality of actuating elements, such as valves. A control unit is provided for generating actuating signals to cause each of the valves to move with one another in a start-stop motion in accordance with a predetermined moving pattern. The control unit would measure each potential at the outermost lowest position of the valve and at the outermost highest position of the valve. A device is provided for determining the present potential percentage value of the different valve between the maximum potential as well as the minimum potential. This different value is used to determine whether an actuating signal would be used to drive each of the actuating elements in the start-stop motion.

6 Claims, 6 Drawing Sheets

ACTUATOR WITH START-STOP OPERATION

This application is a Continuation-in-Part application of patent application Ser. No. 08/402,039 filed Mar. 10, 1995, now abandoned.

FIELD OF THE INVENTION

The present invention relates to an electronically adjustable actuator with start-stop motion to actuate a plurality of valves or to open and close a plurality of valves or shielding plates. It can be actuated by an AC motor or DC motor to adjust an opening width, especially of a valve for feeding a fuel and a valve for feeding air into a combustion equipment.

DESCRIPTION OF THE PRIOR ART

A conventional actuator used to adjust the valve opening has an electrically driven motor or a cylinder driven by a pressure power, at a driving side, and a linear encoder (and/or a linear potentiometer) to measure a position and a distance, or a rotary encoder (or rotary potentiometer) to measure a rotation angle enabling it to adjust the distance and the angle at desired values, with feed-back operation, so as to empower the driving sources at an adjusted side, such as a certain valve opening distance.

When the position of the valve is desired to be adjusted by using an encoder or a potentiometer, a problem that must always be solved is the adjustment of a zero position, and then further, since the span distance adjustment may involve difficult steps, wherein the valve would be opened by moving both ends of the span of the opening of the valve.

For example, the process of adjusting the zero position will comprise adjusting an offset position, and the adjustment of the offset position will involve some drifting and long term shift and short term shift due to aging, and further high level skill is needed to adjust the offset position, involving difficult adjusting steps.

Further, the adjustment of the span distance would depend on the span distance between the complete opening position and the complete closing position, and further, will include distance error, i.e. the adjustment of distance levels such that the adjusted level can be used as an absolute level, or that a regulated value or a standard level will need a skillful technique and thus is difficult to accomplish.

When an actuator is operated by a remote operating device, a target value is set and is automatically compared with a measured value measured by an encoder or a potentiometer, and then, both values should be equal for automation. These desired values shall involve a zero position adjustment and a span distance adjustment, and therefore, the signal for the desired value will be affected by some drift and long term shift in properties of the circuit in which those signals are processed.

Electric signals corresponding to the desired values and the measured values should be compared in identical terms having equivalent dimensions and units. Because the signals sent by the remote control are different in unit from the measured signals for comparison, a converter for converting these units is necessary. However, this necessity of the converter will affect the zero position adjustment and the span distance adjustment, that will make those adjustments difficult.

U.S. Pat. No. 5,285,757 discloses an arrangement having an actuable element movable over a maximum possible operating range between two outermost limits including a normal operating work range within the limits, an electrically actuable actuating device for controlling the actuable element, a control unit for generating actuating signals for controlling the actuable element and for supplying the actuating signals to the actuating device. The control unit is adapted to generate the signals so as to cause the actuable element to move over most of the maximum possible operating range.

U.S. Pat. No. 5,298,845 discloses an anti-windup proportional plus integral controller comprising a setpoint circuit for providing a setpoint signal representative of the desired room temperature, a sensor circuit for sensing the actual room temperature, an error generator for generating an error signal proportional to the difference between the setpoint signal and the sensor signal related to the time integral of the error signal. The integrator may include a capacitance multiplier that provides highly accurate integration of the error signal and a switch for selecting either proportional plus integral or proportional only control.

The prior actuating elements for valve control include a lever linkage type or a cam mechanism, having the following disadvantages:

a) it would take longer to made adjustment before starting;

b) it may be difficult to keep optimum ratio of air to fuel;

c) it can operate the valve merely in a linear relation to operating signals;

d) there is limitation in the assembly; a sub element for control must be in line with a main element because of use of the mechanism of lever linkage;

e) it is not possible to change the rate of operation;

f) it needs adjustment of potentiometer position or position of the sensor to sense the opening space or distance.

SUMMARY OF THE INVENTION

It is an object of the present invention to provide an arrangement for controlling a plurality of actuating elements in start-stop motion thereby reaching each target position at the same time, so they are contacted within a certain range of movement.

It is another object of the present invention to provide an arrangement for controlling and actuating a plurality of elements with start-stop motion to open and close a plurality of valves or shielding plates, wherein each control motor can actuate in start-stop motion the openings of the valves in conjunction with a plurality of operating and actuating patterns.

It is another object of the present invention to provide an arrangement for controlling and actuating in start-stop motion of a plurality of elements, in accordance with a plurality of given operating patterns to allow each element to reach its target position at the same time, such that each stepper motor or AC motor can be readily controlled regarding it's revolution speed by a digital controller operated by a personal computer or a microprocessor.

It is an object of the present invention to provide an arrangement for actuating the start-stop motion such that the movement or opening width of the valves can be adjusted directly at a zero point and at maximum point for measurement of the distance from each target by a digital controller.

It is a further object of the present invention to provide an arrangement for actuating a main element and a sub element in start-stop motion in which the motion of the sub element can be synchronized with the motion of the main element, during the full movement period from the switch-in (starting) time to the full opening time, in response to operating signals.

It is a further object of the present invention to provide an arrangement for actuating a main valve and a sub valve for a combustion furnace, wherein their respective AC motors are operated or adjusted directly by digital signals in a decimal system or binary coded notion, to stepwise change the actuating power for the respective motor, thereby enabling each motor to adjust digitally the openings of each valve, so as to enable desired combustion by a predetermined combustion pattern.

The arrangement includes a plurality of actuable elements which are movable respectively over a maximum possible operating range (e.g. the full operating range of a valve for opening and closing a passageway) between the two outermost limits including a normal operating work range within the limits; a plurality of electrically actuable actuating devices (e.g. a stepper motor or AC motor) for controlling respectively the actuable elements. A control unit is included for generating actuating signals for controlling the actuable elements and for supplying the actuating signals to the actuating device (e.g. a stepper motor or AC motor). The control unit is adapted to generate the signals so as to cause the actuable element to move or rotate over most of the maximum possible operating range, in start-stop motion to the other actuable element(s). The actuable element is moved starting from a starting position and reaching its target position at the same time as other actuable elements, in accordance with given operating patterns. The actuating signal results in a start-stop motion movement of a plurality of elements.

The start-stop motion in accordance with the present invention means that a plurality of actuable elements are moved by starting simultaneously, and one having been moved at the longer distance will stop until the other one arrives at the same corresponding position, and therefore, all the actuable elements will reach the target position, simultaneously and therefore, they are moved in a given pulsed speed for each element in accordance with the operating signals until all elements reach at the same time each target position (target opening) of the main and sub elements, by measuring each opening of the elements, on the basis of data for the opening, so as to trace mutually the position of each the elements. This start-stop motion of the main and sub elements can be attained electronically by feeding pregiven signals to each of the actuating devices, thereby resulting in an "electronic linkage system".

Therefore, the start-stop motion of a main and a sub actuable elements are operated in the same relative speed until they reach each target opening position in response to the given operating position in response to the given operating signals, and therefore, the optimum condition or optimum ratio of air and fuel for the desired combustion for the furnace can be maintained during the operation period.

Further, the arrangement in accordance with the present invention includes the automatic regulation of the potentiometer, a means for feeding error signals and a means of enforcing outside circuits.

Further, the arrangement in accordance with the present invention uses a compact unifying control circuit and actuator, resulting in an inexpensive and precise control of actuating devices (motors).

Further, the inventive actuating arrangement of the present invention can be used in heat ventilation, air conditioning, and refrigeration control as well as in HVAC systems to control the temperature of a fluid or gas for any of a variety of purposes, e.g. to control the temperature of air inside buildings and other enclosures designed for human occupancy, in which the control is accomplished in a start-stop motion among a plurality of actuable elements, in accordance with given operating patterns for the plurality of the actuable elements, such as valves.

Further objects of the present invention will be understood from the following description.

BRIEF DESCRIPTION OF THE DRAWINGS

A more detailed description of the invention is facilitated by reference to the drawings which form a part of this specification and wherein.

DETAILED DESCRIPTION OF PREFERRED EMBODIMENTS

Figure 1:
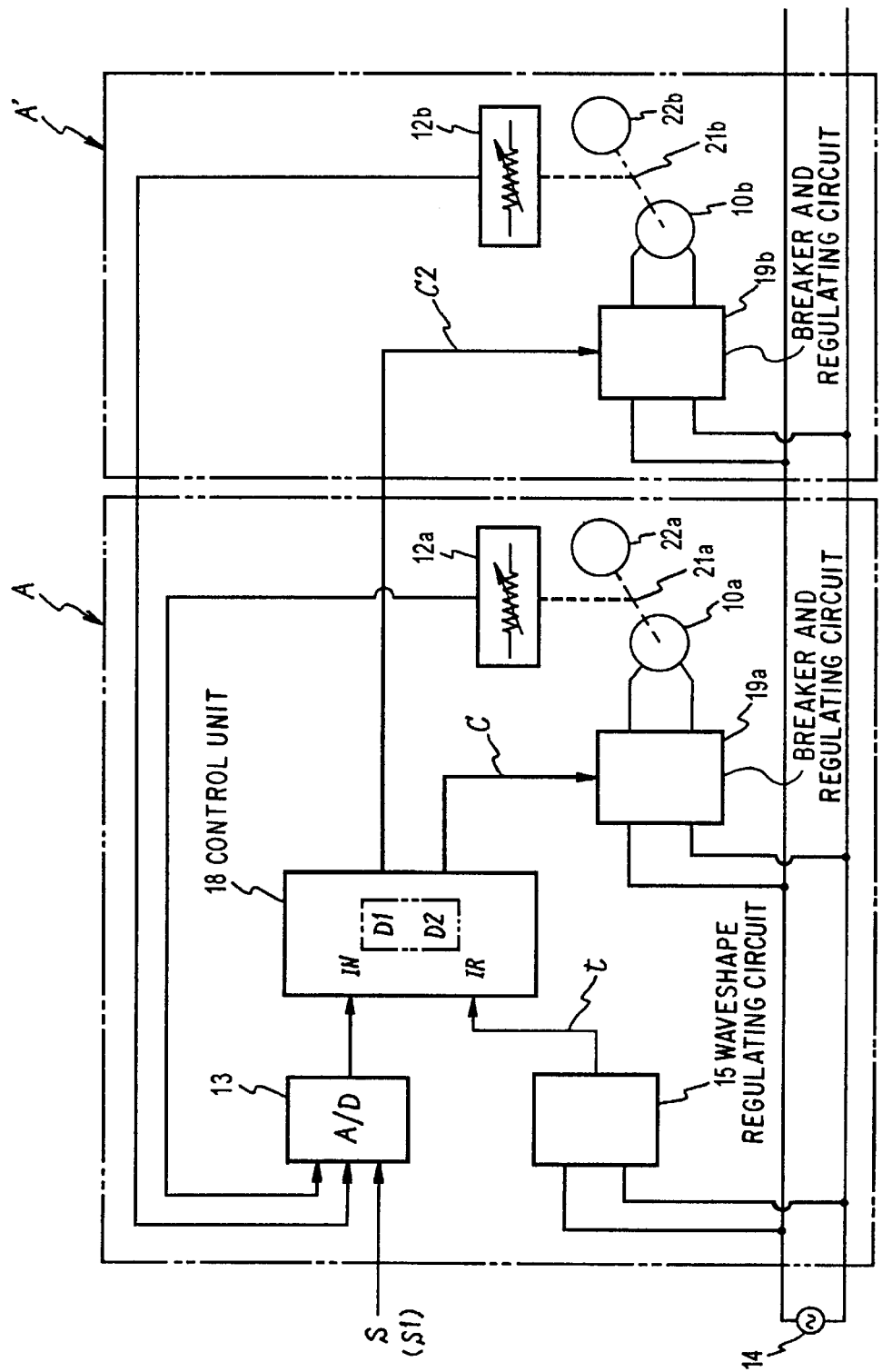
FIG. 1 is a block diagram of an arrangement for controlling in start-stop motion a main valve 10a and a sub valve 10b, which may be operated electronically, in accordance with the present invention.

FIG. 1 shows a schematic diagram of an arrangement for controlling in start-stop motion, for example, two actuable elements (valves), until these two actuable element; i.e. a main element 22a and a sub element 22b reach each target position of elements simultaneously.

Two AC motors 10a and 10b actuate respectively the two elements, i.e. a main element 22a and a sub element 22b digitally and in start-stop motion. The AC motors 10a and 10b are driven by an alternating current source 14 commercially available which has generally 100 volt, or 110 or 220 volt and has a frequency of 50 Hz or 60 Hz.

The main element 22a and the sub element 22b, e.g. a fuel valve and air intake valve are mounted on an arrangement for controlling and actuating in start-stop motion the fuel valve and the air intake valve, in accordance with the predetermined actuating patterns shown, for example, in FIG. 5.

Figure 6:
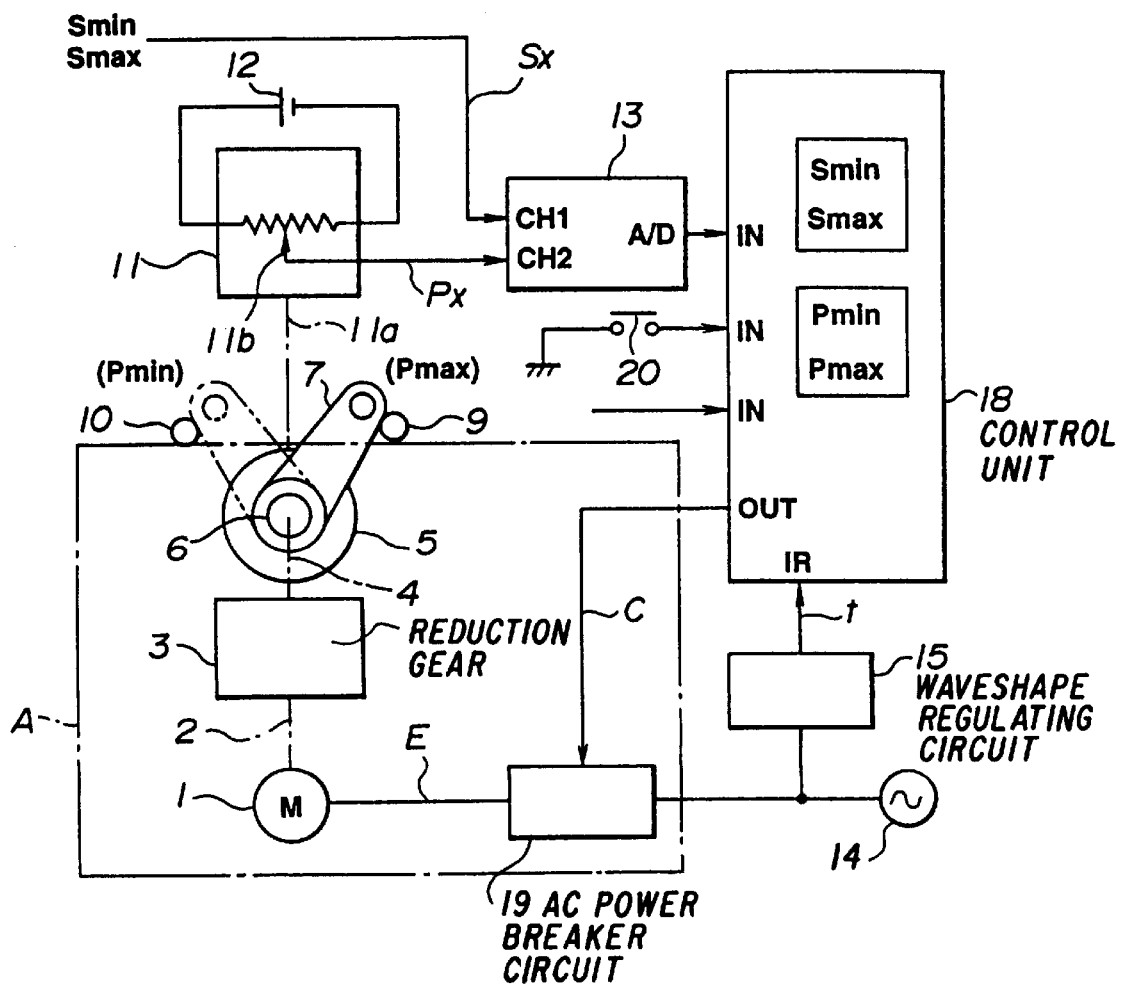
FIG. 6 is a block diagram of a control circuit for use in an arrangement for actuating in start-stop motion of one valve, in FIG. 1.

Either of the actuable elements in the arrangement of the present invention is movable or actuable between a minimum position ($P_{min}$: fully closed) and a maximum position ($P_{max}$: fully opened). While the actual movement of the elements is different, when they both move in a start-stop motion, their movement is dependent on the predetermined patterns which are appropriate to the features and necessity for the elements. The actuable elements are shown in the form of cam shapes 7 as shown in FIG. 6.

Both elements 22a and 22b are mounted respectively on shafts 21a and 21b which are connected respectively by motors 10a and 10b, i.e. electrically-actuable actuator devices (motors) which are supplied with drive signals via a drive line E from a control element 18. Each block shown by A and A' as dotted line boxes are used for the main element and the sub element respectively.

The actuable elements shall move in start-stop motion with each other, until they reach each target position at the same time, in accordance with the necessity of an operation parameter.

Operating variables necessary for controlling each of the actuating devices are supplied to the control unit 18 via the waveshape regulating circuit 15 and an A/D converter 13 having one channel CH2 from the corresponding measuring devices 12a and 12b; or 11 (referring to FIG. 6) and a second channel CH1 from a computer restoring a maximum signal ($S_{max}$) and minimum signal ($S_{min}$).

Variables may include $S_{min}$, $S_{max}$, $P_{min}$ and $P_{max}$ (refer to FIG. 6). $S_{min}$ and $S_{max}$ are respectively the minimum signal for the zero point and maximum signal for full opening of the valve and therefore, are the predetermined values and are respectively 4 mA and 20 mA in the example given hereinafter. $P_{min}$ and $P_{max}$ are respectively a measured potential at the minimum position (full closed) and a measured potential at the maximum position (full opened) (refer to FIG. 6).

The signals representing the positions of the fully closed element and of the fully opened element are supplied via the A/D converter 13 from a computer having a maximum signal ($S_{max}$) and minimum signal ($S_{min}$) (refer to FIG. 6). A further input line (t) of the control unit 18 is connected to the waveshape regulating circuit 15 from the AC source lines for regulating or detecting the waveshape of the alternating current from the source, so as to determine the number of the waves per second (Hz) of the alternating current to be applied to the motor under control.

The actuating signals are supplied respectively through a breaker and regulating circuit 19a or 19b to regulate the respective waveshape or pulses (refer to FIG. 4) of the alternating current from the AC source 14 into each AC motor 10a, 10b via the lines C1 and C2.

There are provided two AC motors 10a and 10b, respectively connected to main and sub elements 22a and 22b via measuring reciprocating sliders 21a and 21b to measure the position of each element. Each of the potentiometers 11 (referring to FIG. 6) is mounted on each slide resistance member 12a and 12b, so as to measure the potential of the slide resistances 12a and 12b, as a relative distance from the zero point, that is, the relative position of the actuable elements, i.e. the main element 22a and sub element 22b.

Referring to FIG. 6 illustrating only one actuable element 7, the potentiometer 11 is electrically connected to a standard source 12 at both terminals of a resistance, and a partial voltage corresponding to a rotation angle (position) from a central slide terminal 11b to the slide shaft 11a is measured across both terminals. The slide terminal 11b is electrically connected to one of channels of the analog-digital converter 13.

Therefore, the potentiometers will measure the positions of the main and sub elements, as a feedback signal, and the resulting signal potentials representing the positions of the main and sub elements are converted into a digital value through the same A/D converter 13. Therefore, the measured potentials representing each of the positions of the main and sub elements are read and stored in the control unit 18, as a digital value.

Further, the operating pattern (refer to FIG. 5) for the desired combustion of the furnace can be selected or predetermined among various operating patterns, or by calculating desired combustion patterns of the ratio of air and fuel to be fed to the furnace, or other device. Each of the predetermined patterns is stored in the control unit 18 together with $S_{min}$ and $S_{max}$. Therefore, a percentage value can be determined from the stored operating pattern, comparing the measured potentials with the target values, converted to a digital value in the control unit 18. Those digital values are used to operate the main and sub elements in a start-stop motion in accordance with the present invention, as illustrated below:

The control unit 18 in accordance with the present invention will generate and supply the actuating signals respectively to control each of the actuating devices, thereby moving the main and sub element in start-stop motion each together, in accordance with a predetermined moving pattern, within the limited moving possible range, by starting each of the main and sub elements from a predetermined position, and then moving each of the elements in start-stop motion based upon the respective predetermined moving pattern, thereby reaching each target position at the same time.

Further, there is provided a slide resistance with a slider moving along with a corresponding position of each of the actuable elements to generate a potential or voltage corresponding to the distance from the zero position of each the actuable elements.

The control unit, in accordance with the present invention, shall receive the potential value signals generated in the slide resistance through a analog/digital converter, and shall initially record a minimum coordinate value and a maximum coordinate value respectively corresponding to the potential or voltage generated in the slide resistance at the full closed position and the full opened position of each element which is respectively moved within its respective predetermined moving range. Each of the predetermined operating patterns for each actuable element use each of the initially recorded minimum and maximum values for generating the actuating signals for each actuating device, and for each of the actuable elements, thereby moving each element within a respective operating range.

The control unit 18 shall determine as a digital value, the ratio or percentage of the difference from the potential as recorded at the fully closed position to the present measured potential of each valve which are generated by its respective slide resistance compared to the difference between the measured minimum and maximum potentials. The determination results in a percentage value at each of applied signals (in a pregiven internal from the zero point to the full open point, that is, from 4 mA to 20 mA), within the limited moving possible range, in other words, from the full closed position to the full open position, on the basis of the predetermined operating pattern as stored in the control unit 18 (refer to FIG. 5).

The control unit 18 compares the potential percentage representing the present or actual position of each element with the percentage of the target position from the original position, based on the recorded pattern. If the difference between the potential percentage and the percentage at the target position deviates more than 5%, the control unit 18 feeds the actuating signals via the driving circuit or the breaker circuit into the actuating device so as to move each the element in a certain rate, as illustrated in FIG. 4.

Figure 4:
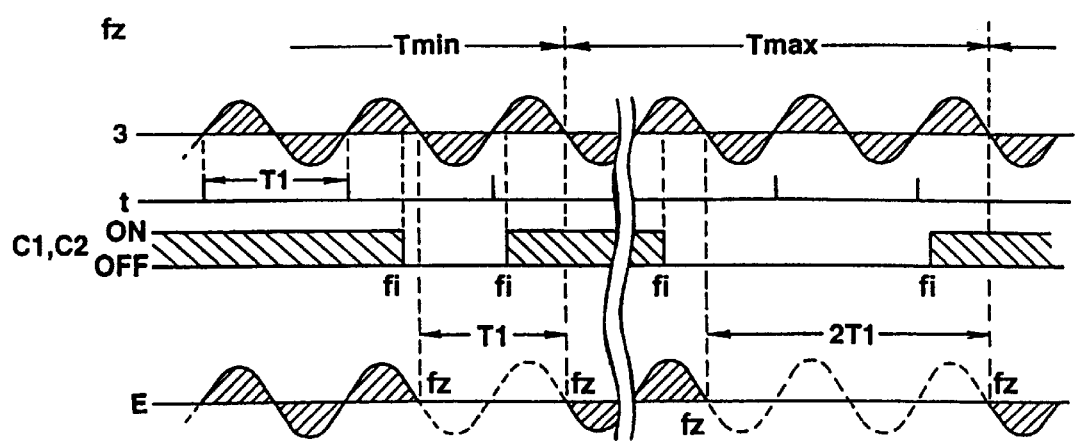
FIG. 4 shows a time chart showing a waveshape of significant signals flowing in the circuits used in FIG. 1 for one valve.

Therefore, the control unit will feed respectively the actuating signals as shown in FIG. 4 to each driving circuit 19 so as to move the actuable elements at the same rate or rotation. The start-stop motion of the inventive actuator is operated in accordance with e.g. each pattern of FIG. 5.

Referring to FIG. 5, six exemplary graphs (A to F) indicate the percentage relations between input signals (abscissa–4 mA to 20 mA) and controlled openings (ordinate–0 to 100%) in the main and sub valves (the position of the actuable elements) actuated respectively by each of predetermined actuating patterns. The arrangement for controlling and actuating in start-stop motion a plurality of elements in accordance with the present invention operates the main and sub valves along with any kind of operating pattern among with an optimum pattern can be selected or predetermined for certain furnace. For example, the pattern shown in FIG. 5A illustrates a situation in which the ratio of two components is linear, e.g. for temperature control by changing the ratio of hot water and cold water, or the ratio of iced water and the common water, resulting in the flow of a constant amount of water. As illustrated from the pattern of FIG. 5A when the sub valve is fully opened, the main valve is fully closed, and when the sub valve is fully closed, the main valve is fully opened.

Figure 5A:
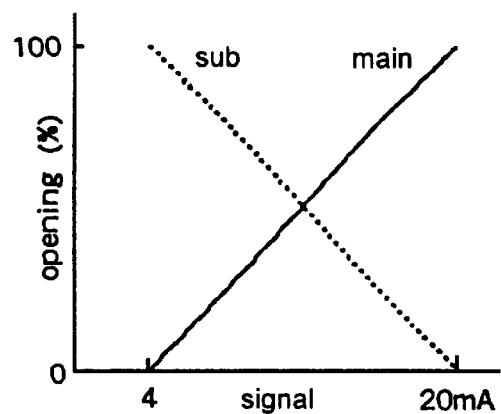
FIG. 5 shows six graphs indicating each operating pattern, or the relation between input signals and controlled openings actuated respectively by each of predetermined signal patterns, for actuating in start-stop motion a main valve and a sub valve.
Figure 5B:
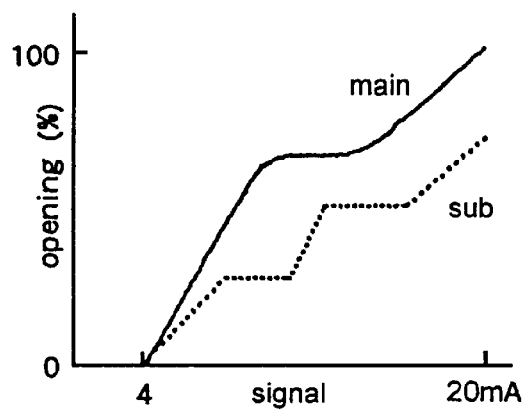
Figure 5C:
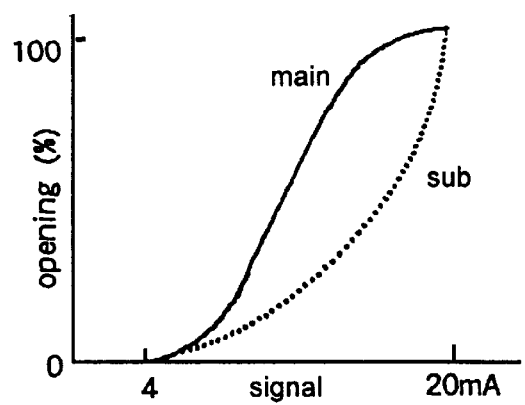
Figure 5D:
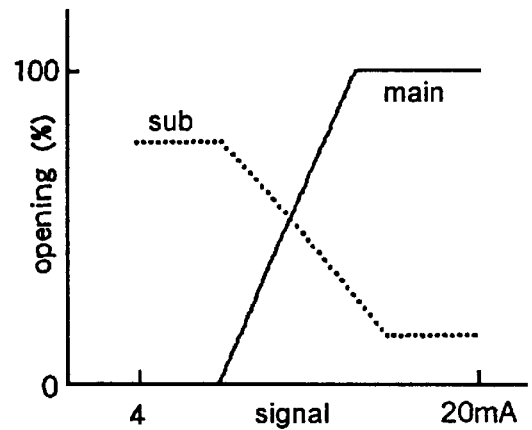
Figure 5E:
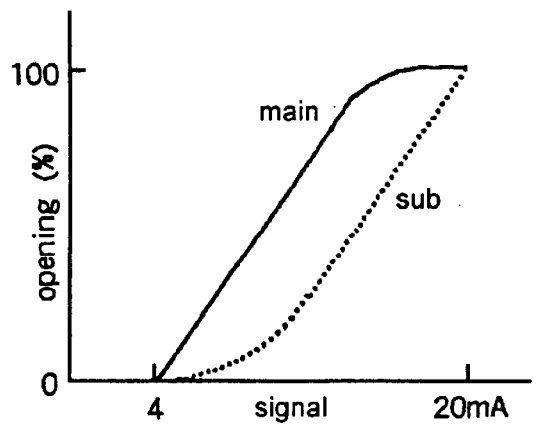
Figure 5F:
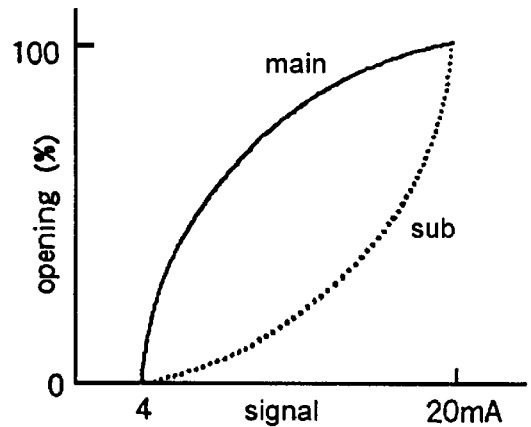

Further, the pattern shown in FIG. 5F, particularly the opening curve of the main valve, allows the flow rate through the main valve to increase in linear fashion, because the flow rate will increase at a constant rate if the valve opens rapidly at the first stage, and opens more slowly in the final stage. Please note that the valve is fully open at 90°. Therefore, the air flows through the main valve of FIG. 5F, and increases at a different rate than the fluid flowing through the sub valve of FIG. 5F, thereby gradually increasing the combustion for a certain purpose of the combustion furnace.

As shown in FIG. 5, any type of pattern for a desired operation can be accomplished if the desired pattern is read in the control unit through the use of any reading device, such as a personal computer.

The percentage value determined on the basis of a predetermined operating pattern is relatively compared with the potential percentage value from the potentiometers, and, if desired, the comparison can be carried out digitally.

Therefore, only when the difference is more than the predetermined sensing limit which may range from ±1 to 5%, the respective motor for the main and sub elements is actuated at the rate in which the rotation is moved by using step by step movement as shown in FIG. 4. Accordingly, each element is moved in a constant rate, i.e. step by step, along with the pattern as stored in the unit, until it reaches the target position. When each element approaches the target position (when the difference is within ±1.3%), the rate or speed of the element is decreased by half of the constant speed over the passage toward the target. Then, when the difference is less than ±0.5%, the unit feeds the signal for the lowest speed, that is, 2 pulses to move the element toward the target. Thereafter, when the difference between the potential percentage and the percentage at the target position is ±0.3%, the unit does not feed the signal to stop the element. Therefore, the resulting difference for each of the main and sub elements shall be within ±0.3% for each target position.

A plurality of actuable elements can be moved in a start-stop motion in accordance with the predetermined patterns for each of the elements, and the difference from the predetermined patterns shall be within ±5% during the passage toward each target position.

As a result, the potential percentage of each element should become equal or nearly equal to the percentage value based on the predetermined operating pattern.

Further, only for the operational convenience, when the digital value from the potentiometer for the feed-back signal is not changed even after the predetermined numbers of actuating pulses or cycles for actuating the elements provided with the potentiometer, an error signal will be generated to the main or sub element, so as to stop or discontinue the movement.

In a concrete example, the control unit will feed operating signals to each driving circuit 19a, 19b, for each actuating device (motor) for each of actuable elements (valves), thereby moving (opening) each element (valve) in start-stop motion, and all elements (valves) reaching to each target position at the same time, within the respective operating range.

Furthermore, the arrangement for controlling a plurality of actuable elements can be provided with a monitoring system such that when the opening or operation of the actuable elements exceeds the given point(s) (which can be plural), the signal for opening the valve shall be "on" to indicate respectively that the opening or operation exceeds a given point, e.g. when the opening of the valve exceed respectively 30% and 60%, this fact would be sensed by the monitoring system. Further, when the opening is between 29% or 59%, the signal of opening shall be "off" to indicate that the opening or operation is below the given point, e.g. that the opening of the valve is below 30% or 60%.

In the arrangement, when a fully closing signal or a fully opening signal is imparted, the selected motor is driven to force the actuable element to move to the fully closed limit position or the fully opened limit position. The maximum opening or operation range (angle range) of each motor shall be automatically controlled or adjusted by a command signal or signals from the control unit.

FIG. 6 illustrates how to actuate the actuable elements. In the drawing, a cam 7 is mounted on a shaft 6 (a stem shaft when the element is a valve), wherein the cam 7 is brought to a stop by a stopper pin 9 for engaging the element at the fully opened position, and to a fully closed position by a stopper pin 10, for fully closing the valve. The shaft 6 (21a or 21b) is connected on a reciprocatable slide shaft 11a mounted in a potentiometer 11.

Figure 2:
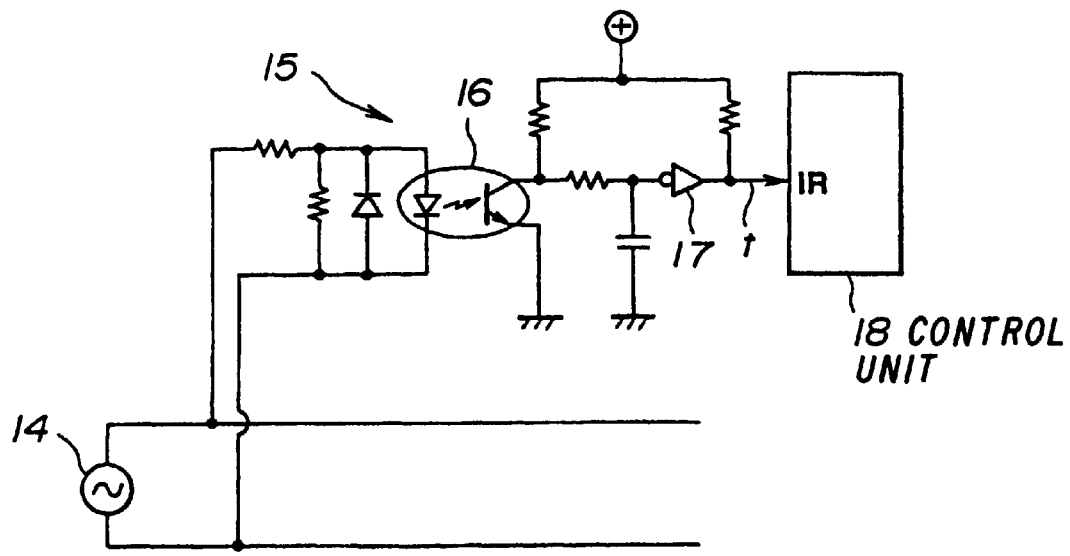
FIG. 2 shows an electronic circuit for use in the waveshape regulating circuit 15 in FIG. 1, in accordance with the present invention.

A waveshape regulating circuit 15 is provided to an electrically driven actuator or an AC motor (A of FIG. 6). The control unit 18 can restrict the cycle number of the sine curve of the AC from the source 14 within the maximum period, which has, as shown in FIG. 2, a photocoupler 16 and a comparator 17 for isolation of the waveshape of the AC. A commercially-available electric source of alternating current can be used as a source o the AC motor (A of FIG. 6).

The waveshape or applied wave number (frequency) of the AC voltage is formed as shown in FIG. 4 into the curve E, by pulse signal (t:C1, C2) having a constant interval time (T1) of one cycle or one wavelength of the sine curve of the applied alternating current power. In FIG. 4, a line 3 shows a normal alternating current from the commercial electric source. Control pulse signals are denoted as (t:C1, C2), in which "ON" indicates that the current should be applied, and "OFF" indicates that the current should not be applied.

The waveshape 15 can detect the waveshape or the wave number (Hz) of the alternating current from the source, and the detected information is received from port IR of the control unit 18. The digital control unit 18 comprises a microprocessor which includes a necessary program, or software memorized to function in the following manner.

The control unit 18 includes a routine to measure a pulse interval of pulse signal (t:C1, C2 of FIG. 4) generated for every cycle of the sine wave of the AC, in the waveshape regulating circuit 15. Furthermore, the central unit 18 repeatedly counts a necessary integer time (N) of one cycle or one wavelength duration (T1) of the sine curve, within a predetermined period ($T_{max}$) referring to as the maximum power unit period ($T_{max}$=N×T1).

Further, the control unit 18 stores or records preset values of each of the adjusting variables or data, e.g. $S_{min}$, $S_{max}$, $P_{min}$ and $P_{max}$ and $D_1$ and $D_2$ of discontinuous (non-analog) values crresponding respectively to digital adjustments of, for example, the cycle number of the sine wave of the AC, or the integer time thereof, and/or codes corresponding to the cycle number of the sine curve current to be applied to the AC motor 1, within the maximum power unit period ($T_{max}$).

The digital control unit 18 sends binary signals representing the numbers of the sine waves included within the maximum power unit period ($T_{max}$), which respectively corresponds to the control data i.e. $D_1$, and $D_2$ present therein, and drives the AC motor 1 according to the control data.

The binary signals (C:C1 and C2 in FIG. 4) for operating the AC motor 1 are sent from the digital control unit 18 into the circuit 19 regulating the waveshape of the AC from the source 14, as shown in FIG. 4, and enters from the terminals into the breaker circuit 19 in which the signals will discontinue (break) at intervals of a predetermined period. In this manner, power is digitally applied to the AC motor 1 from the source 14.

Figure 3:
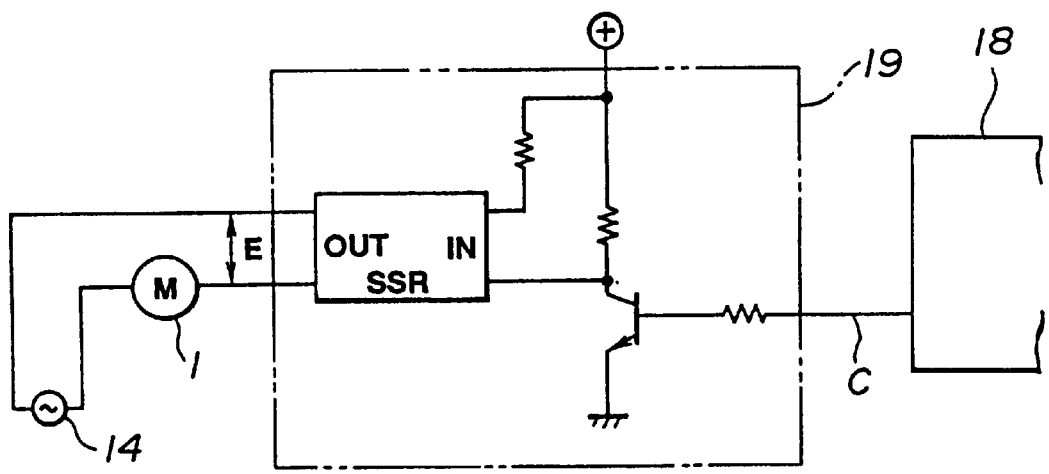
FIG. 3 shows an electronic circuit 19 for use in an alternating current power breaker, in FIG. 1.

The breaker circuit 19 will break the voltage waveshape of the AC power according to the binary signals sent from the digital control unit 18, as shown in FIGS. 3 and 4.

As shown in FIG. 4, each changeover point of the binary signals (C1, C2) does not agree to each of the zero points of the AC sine wave voltage (E) to be broken. The AC voltage (E) discontinues to continues from the first zero point appearing after the changeover (rise or fall) of the binary signals (c).

For example, actuating signal currents ranging from 4 mA to 20 mA are converted into a voltage, e.g. the range of 0.8 V to 4.0 V by using a resistance of 200 ohm, and converted into a digital value through an A/D converter 13. The resulting digital values are revised in line with revising predetermined patterns or data.

The control unit as shown in FIG. 6, is provided with an AC motor 21 having a reduction gear 3 connected to a power shaft 2. A power shaft 4 of the reduction gear 3 is combined with a rotation shaft 6 to allow assembly 5 to be adjusted, and is mounted thereon.

The assembly 5 comprises a valve device which can adjust precisely the position of the control between the fully opened position 9 and the fully closed position 10. A cam plate 7 is fixed on the rotation shaft 6 (corresponding to a stem shaft in a valve) of the assembly 5. Therefore, the cam plate 7 will be stopped by either the fully opened position by stopper pin 9 or the fully closed position by stopper pin 10. The slider 11a of the potentiometer 11 is fixed on the rotation shaft 6 of the assembly 5.

Both terminals of the potentiometer 11 are connected to a standard source of power 12. Due to a change in resistance, the slider terminal 11b can sense a partial voltage in proportion to the rotation angle of the slider shaft 11a. The terminal of the slider shaft 11a is connected to one channel (CH2) of the analog/digital converter 13.

A voltage signal for adjustment is fed from the other channel (CH1) into the analog/digital converter 13. Operation signals for remote control are usually fed through a current source, but in accordance with the present invention, the voltage signals are signals converted from current source, and such conversion is different from the signal conversion for coinciding with a dimension or a sensitivity.

The AC motor 1 may use a commercially-available alternating current source 14 which has a potential of generally 100 volt, or 110 or 220 volts with a frequency of 50 Hz or 60 Hz.

The waveshape regulating circuit 15 as shown in FIG. 2 will regulate and extract a waveshape corresponding to the duration of one wavelength of a sine curve waveshape of the alternating current from the source 14 can be regulated through a photocoupler 16 and a comparator 17 for use in isolation so as to produce a pulse signal (t:C1, C2) having the interval equal to one cycle duration of the sine wave of the AC.

The pulse signal (t:C1, C2) from the waveshape regulating circuit 15 will enter into one input port (IR) of the control unit 18. When a digital processing unit (which may be generally an IC component of a microprocessor) without multiple input ports is used, an interruptible port should be used. The control unit 18 for the AC motor comprises a digital microprocessor which includes a desired program to perform its function as described herein. For example, the unit 18 will determine in a routine way the interval of pulses (t:C1, C2) as generated within one cycle duration of the sine waves extracted by the waveshape regulating circuit 15, and further, in a routine way to repeatedly count the time $T_{max}$ which is predetermined as a maximum power unit time ($T_{max}$=N×T1).

Further, the control unit 18 for the AC motor will optionally send an input control data (C) which are noncontinuous (non-analogous) values in response to the digits to operate digitally, e.g. the number of cycles of the sine waves, or the integral number of the cycles of the sine curves of the AC applied to the AC motor within the maximum power unit duration ($T_{max}$), according to the desired power revolution number of the AC motor 1, into the motor 1. It will then feed binary signals in accordance to the number of sinusoidal waves included in the maximum output unit time ($T_{max}$) according to the input control data (C).

A binary signal (C:C1, C2) generated from the control unit 18 for the AC motor will enter into an input terminal of an alternating current power breaker 19 to interrupt a power applied to the AC motor 1, by a duration unit of one cycle of the sine wave of the AC, and then, operate the AC motor by processing the source current from a source 14.

The source interrupting circuit 19 will interrupt the voltage waves of the alternating current from the source 14 in accordance with the binary signals (C:C1, C2) from the digital control unit 18, as shown in FIGS. 3 and 4.

It is provided that the binary signals (C:C1, C2) to be fed into the alternating current power interrupting circuit 19 is not necessarily corresponding to the intervals of the interrupting alternating current power waveshape (E), and the interval alternating current signals (E) will determine a first zero cross point after the first interval (raising range or decreasing range) of the binary signals (C:C1, C2).

As a result, the interrupting circuit 19 will receive the binary signals (C:C1, C2) to change the phase of the sine curve of the AC, so as to interrupt the power by one cycle period.

The control components having the above mentioned function may be preferably a semiconductor alternating current switch such as a solid state relay (SSR) element.

The binary signals (C:C1, C2) will determine the number of the sine wave cycles to be included in the maximum power unit period ($T_{max}$) and then the output from the alternating current power interrupting circuit 19 is a quantum power digitized by one sine curve cycle unit (digit).

The maximum power unit period ($T_{max}$) is preferably 300 milliseconds which is a common multiple of 50 Hz and 60 Hz which are nominal frequencies publicly available in Japan.

Therefore, when a commercial power source having 50 Hz is used, one digit in one cycle of the sine curve of the power is 20 milliseconds, which will enable it to adjust digitally in fifteen steps in one second, the power to be fed in the AC motor. Further, when a commercial power source having 60 Hz is used, one digit in one cycle of the AC power is 16.7 milliseconds, that will enable it to adjust digitally the power in eighteen steps.

The rotation number of the AC motor 1 is proportional to the power applied at a constant loading, and therefore, it will change stepwise in accordance with the change step of the power applied. This stepwise change corresponds to the control data (C). The rotation number of the AC motor 1 will then be sent into the control unit 18 so as to enable operation by digital control. The output signals from the analog/digital converter 13 will be sent into the control unit 18.

The control unit 28 is provided with an initial preset mode circuit which shall turn on a switch 20. The initial preset mode initiates to drive the AC motor 1 until it rotates to the stopper pin 10 position which corresponds to the fully closed position.

The unit 18 incorporates a minimum position value ($P_{min}$) obtained by measuring a coordinate value [the minimum position value ($P_{min}$)] of the element 5 at the minimum control position (fully closed position), which is to be fed into the analog/digital converter 13 during the initial preset mode. The incorporated minimum control position coordinate (fully closed position) of the element 5 is recorded in a routine manner in a non-volatile memory which is provided with a back-up power source.

The assembly 5 including shaft 6 and cam 7 of the valve will be driven to rotate until it reaches the fully opened position, at which time the coordinate of the element at that position is measured [the maximum position value ($P_{max}$)] and recorded in the non-volatile memory, in the same manner as described with response to $P_{min}$.

After the minimum position value ($P_{min}$) and the maximum position value ($P_{max}$) of the element are recorded, the minimum control value ($S_{min}$) and the maximum control value ($S_{max}$) of the control signals (S) sequentially transmitted to the analog/digital converter 13 and both of the signal values are recorded within the control unit 18.

After the initially preset modes have been finished, the ordinary control mode is returned so that the position of the rotation shaft 6 provided with the element 5 is adjusted by using the control signals (Sx).

The control unit 18 of the present invention does not compare directly the measured position potential values (Px) of the element 5 with the control signal value (Sx) when the element 5 is at the desired position, but does use the minimum signal value ($S_{min}$) and the maximum signal value ($S_{max}$) for control signals (S) as recorded in the memory, as well as the minimum position potential value ($P_{min}$) and the maximum position potential value ($P_{max}$) of the element 5, to determine the ratio of the present position potential value (Px) to the difference between the minimum position potential value ($P_{min}$) and the maximum position potential value ($P_{max}$), as a reference value.

Subsequently, the unit 18 compares both of the ratios, and operates the AC motor 1 of the arrangement in a start-stop motion actuated using a feedback operation, so that the ratio of the measured position potential values (Px) of the element 5 to the difference between the minimum signal value ($S_{min}$) and the maximum signal value ($S_{max}$) should be equal to the ratio of the present position potential value (Px) to the difference between the minimum position potential value ($P_{min}$) and the maximum position potential value ($P_{max}$)

With respect to the control signals (S); desired control ratio=(Sx $-S_{min}$)/($S_{max}-S_{min}$) such that this target control ratio can be represented by a percentage.

With respect to the measured value (P); present position ratio=(Px $-P_{min}$)/($P_{max}-P_{min}$) such that this ratio can be represented by percentage.

The control unit 18 will compare the present position measured ratio (P) of the element with the desired control signal ratio (s) of the element, and then the binary signal (C) representing the present position of the element will be adjusted so that the present position ratio should be approaching or equal to the desired signal ratio or ratios.

The velocity of the AC motor 1 can be adjusted by the control data (C), so that while the both ratios are becoming equal, the velocity of the AC motor 1 will be reduced so that the coincidency accuracy can be improved.

Position information of the measured value and position information of each target value are processed in accordance with the present invention, so as to represent in terms of the percentage or ratio on the basis of a signal value of the distance information between the predetermined minimum value and the predetermined maximum value fed into the signal processing system. Therefore, there is no need of an identifying position value, and further, no need of coinciding the zero position value to a certain absolute value. Consequently, the initial adjustment will be significantly easy, and further readjustment at the time of maintenance service will also be easy.

The scale factor (gain) component of the control signals are compensated together so that adjustment of span distance level becomes unnecessary, and the initial adjustment will be easily made. Furthermore, high stability and high accuracy of the processing circuit is not necessary in designing a processing assembly and circuit for the signals to be processed.

Further, the two values (percentage or ratios) to be compared in the feedback procedure will be represented in terms of a ratio or dimensionless numerals, and therefore, there will be no need to coinciding their dimension, resulting in processing signal simplicity.

FIG. 2 shows an electronic circuit for use in the waveshape regulating circuit 15 in FIG. 1. The waveshape regulating circuit 15 including the circuit as shown in FIG. 2, will regulate and extract a waveshape corresponding to the duration of one wavelength in the sine curve waveshape of the alternating current from the source 14. The waveshape of the alternating current from the source 14 can be regulated through a photocoupler 16 and a comparator 17 for use in isolation so as to produce a pulse signal (t:C1, C2) having the interval equal to one cycle duration of the sine wave of the AC.

The pulse signal (t:C1, C2) from the waveshape regulating circuit 15 will enter into one input port (IR) of the control unit 18. When a digital processing circuit (which may be generally an IC component for microprocessor) without multiple input ports is used, the interruptible port should be used. The control unit 18 comprises a digital microprocessor which includes a desired program to perform its function as described herein. For example, the control unit 18 will determine in a routine way the interval of pulses (t:C1, C2) as generated within one cycle duration of the sine waves extracted by the waveshape regulating circuit 15, and further, in a routine way to repeatedly count the time $T_{max}$ which is predetermined as a maximum power unit time $(T_{max}=N \times T1)$.

Further, the control unit 18 will optionally send an input control data (C) which are noncontinuous (non-analogeous) values in response to the digits to operate digitally, e.g. the number of cycles of the sine waves, or the integral number of the cycles of the sine curves of the AC applied to the AC motor within the maximum power unit duration ($T_{max}$), according to the desired power revolution number of the AC motor 1, into the motor 1. It will then feed binary signals in accordance to the number of sinusoidal waves included in the maximum output unit time ($T_{max}$) according to the input control data (C).

Figure 7:
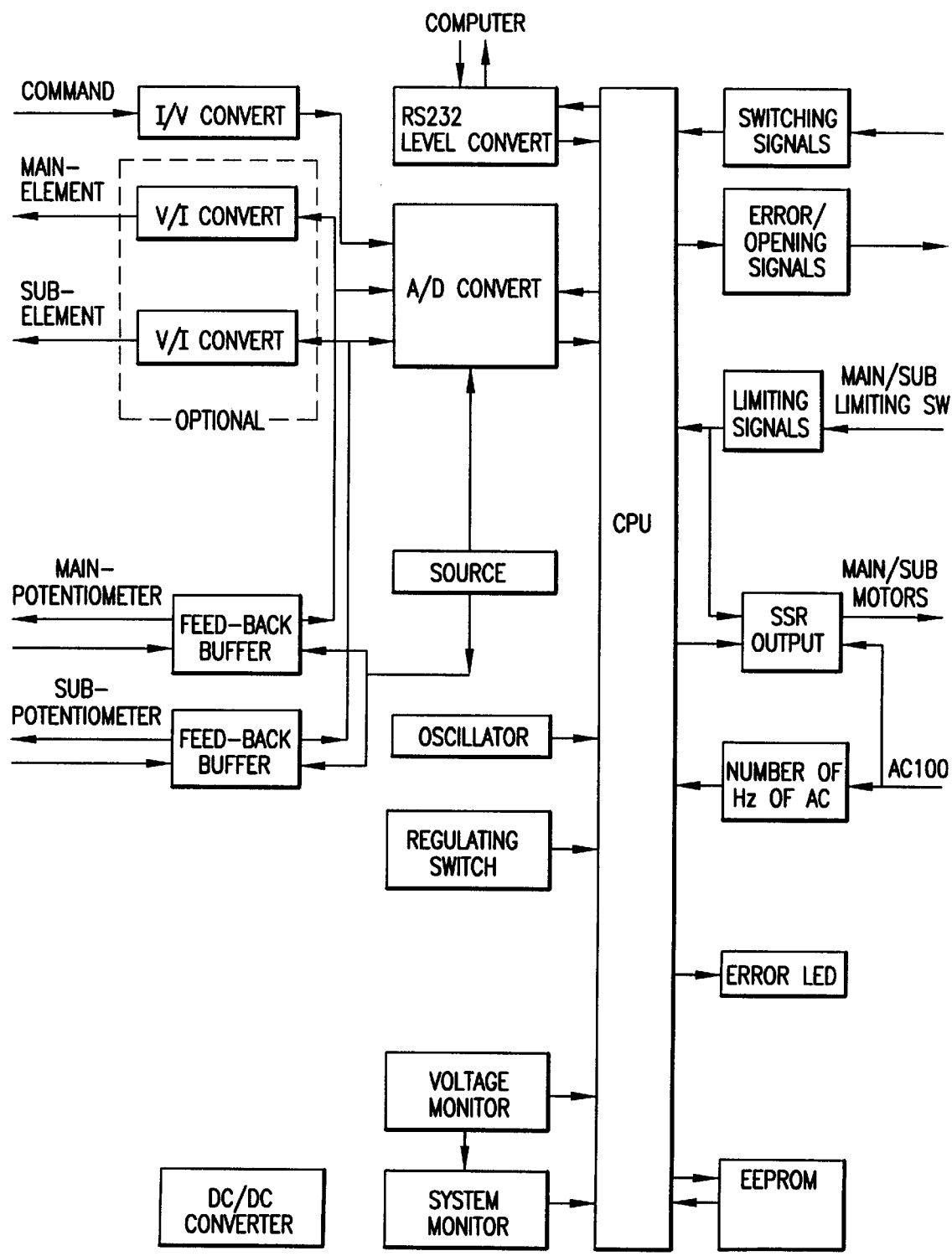
FIG. 7 is a block diagram of the control circuits to actuate two actuable elements (valves), i.e. a main element and a sub element in start-stop motion in accordance with the present invention.

FIG. 7 is a block diagram of a control circuit to actuate the start-stop motion two actuable elements (valves), i.e. the main valve and sub valve.

In accordance with one embodiment of the present invention, the two valves can be moved within the limited possible operating range between the fully closed position and the fully open position in accordance with each predetermined operating pattern. The two valves are operated in start-stop motion in accordance with each predetermined operating pattern. Each motor is mounted on each valve respectively for controlling each valve. Therefore, the control unit will generate the actuating signals respectively so as to move each valve in a start-stop motion in accordance with the predetermined moving pattern, within the limited moving possible range. Each valve will be moved starting from each predetermined position in a start-stop motion along with the respective predetermined moving pattern, thereby reaching each target position at the same time. The movement of each valve is sensed using a slide resistance value of a slider moving along with the corresponding position of each valve to generate a potential or voltage corresponding to the distance from the zero position of each valve. The control unit receives the signals of the potential generated or measured in the slide resistance. The central unit initially senses and records the potential measured at the fully closed position of each valve, and the potential at the fully opened position of each valve as the valve is moved between these positions. The central unit further stores each of the predetermined operating patterns for each valve.

Subsequently, the central unit determines respectively the present potential percentage of the difference of each present potential measured by the respective slide resistance from the fully closed potential, with the difference between the fully closed potential and the fully opened potential, and further, determines respectively the percentage at each shifted position toward the target position. The control driving circuit feeds each actuating signals from the control unit to each motor for each valve so as to send the actuating signals to each valve when the difference at each shifted position is more than a pregiven value, by shifting gradually the signal current in a certain interval toward the target position, thereby moving each valve in start-stop motion so as to reach each target position at the same time.

The functions of each block shown in FIG. 7 are illustrated as follows:

The I/V convert box represents an I/V converter to convert current command signals (4 mA to 20 mA) into voltage signals (0.8 V to 4.0V) through a resistance of 200 ohms.

The V/I convert box is optional and is used to feed the current signals (4 mA to 20 mA) which are converted from a voltage measured by the position sensors 12a and 12b (potentiometer) mounted respectively on the main and sub valves.

The feedback buffer is used to feed standard voltages to the position sensors 12a and 12b (potentiometer), and to send the position signals from the sensors through buffering into the A/D converter 13 to convert the data from a voltage signal to a current signal (V/I convert).

The DC/DC convert box represents an insulating converter used to convert 5V into 5V so as to feed signals to the external limiting switch or SSR.

The RS232 level convert box represents a conversion leveler for RS232 communication with a communication rate of 9600 bits per second.

The A/D convert box converts voltage signals (analog) including commands and position potentials detected by the sensors into digital signals so as to send the converted signals sequentially into the "CPU".

The source box is used to feed +5.0 V to the position sensors and the A/D converter, in response to a standard signal.

The oscillator is a quartz oscillator of 14.7456 MHZ used to feed a clock pulse to the CPU.

The CPU is a personal computer with central processing unit of 8 bits, input and output ports as well as a read only memory (ROM) and a random access memory (RAM).

The switching signals box is used to feed a full opening and full closing signal to both of the main and sub valves.

The error/opening signal box is used to count the power cycle number to drive each motor when the signals to open or close are applied to either motor as well as to monitor the position of each valve, and to feed an "ON" signal or error signal when any change of the position is not detected.

The limiting signal box represents the position signals used to open fully or to close fully each valve to be fed in each motor, and to stop the valve at the full open or full close position.

The SSR output box represents a driving circuit for each motor of the main and sub valves.

The number of Hz or AC box is used to detect the frequency of the alternating current source, and to feed the timing signal to drive each motor.

"EEPROM" is a memory used to restore internal data including correction data and fully closed position and fully open position data.

The full opening position can be optionally determined to follow:

The opening position responds to the operating signals (4 mA to 20 mA in digital) and can be optionally fixed or determined independently on the main and sub valves. The opening position verses the operating signal (the operating pattern) can be compared at between two and sixteen points. Therefore, the opening of each of the valves can be variable in response to the operating signals.

The speed of moving the valves can be changed, e.g. in eleven steps. As shown in FIG. 4, the periods of "ON" and "OFF" can be changed or selected so as to predetermine the moving rate of the valves.

The operating pattern can be selected or predetermined by entering the opening data optionally at two points to sixteen points. Therefore, when the pattern is predetermined at sixteen points and initially stored in the computer, the operation or the opening operation can be attained smoothly and precisely. Each data or the operating pattern as used can be stored in a floppy disk and then can be read from it, enabling data to be easily entered and to change the data for the opening operation.

The movement of the plurality of actuable elements or valves can be regulated or adjusted in start-stop motion to be operated by the computer-aided processing of the data. The opening data can be independently predetermined for each actuable element or valve in which each valve can be moved smoothly and precisely along with the predetermined patterns.

The arrangement of actuating actuable elements, in accordance with the present invention has a good maintenance performance especially in the adjustment of the potentiometers. When it is necessary to replace the potentiometers, the zero adjustment and span adjustment of the potentiometer after replacement will be unnecessary so that the cost of adjustment can be saved.

There can be provided a means of forcing full opening and full closing, in which the actuating signals to force full opening or full closing will enter independently on the other actuating signals.

The sensing range for actuating the movement when a sensed difference is encountered allows the rate of movement of the valve to be easily changed, as well as selecting a predetermined pattern before operation.

The outermost positions can be two positions, i.e. the highest position (fully opened) and the lowest position (fully closed) for each actuable element. The ultimate position can be predetermined by entering the data into the computer.

In accordance with the present invention, both of the difference values as determined from the measured potential value for the position of each actuable element and the minimum potential value for the fully opened position of each element, and the desired percentage value for the element's position can be represented by a unitless or dimensionless quantity such as a percentage or a ratio, thereby eliminating adjustment at a zero point. Furthermore, there is no need of dimensional coincidence for further determination and comparison of the element's coordinates. Therefore, an initial adjustment for measurements can be simplified.

The elements to be actuated and operated by the start-stop motion actuating arrangement is restricted or restrained within the desired range of its movement, and such desired range has maximum position and a minimum position (coordinates).

The maximum position and the minimum position of the actuable elements can be measured by a position sensor and the resulting measured maximum value and minimum value (coordinates) are initially recorded in a computer, as a potential value.

The maximum potential value represents the maximum position of each element and the minimum potential value corresponds to the minimum position of each element.

Control values (signals) to be fed for adjustment of each element's position are restricted within a given control range, that is, having a minimum control value, e.g. 4 mA and a maximum control value, e.g. 20 mA to determine the restricted control range. Those minimum control value and maximum control value shall be initially recorded in a computer.

The arrangement for actuating in a start-stop motion a plurality of actuable elements can be automatically operated to move in start-stop motion to reach a target position. This is accomplished by measuring the present position of each element, and determining the percentage or ratio of the measured present potential value (coordinates) to the restricted range (restricted distance), on the basis of the recorded minimum value and maximum potential value (coordinates), and further determining a percentage or ratio of the desired value at the desired position of the elements, to the moving range of each element, on the basis of the recorded control minimum value and maximum value. Each element is then moved in a start-stop motion so that the position of each element should be at the position in that percentage or ratio for the desired value to be equal to the percentage or ratio for the measured value.

The arrangement for actuating in a start-stop motion a plurality of elements in accordance with the present invention comprises:

respective AC motor or stepper motor driven by respective alternating current or pulse current modified by respective signals from a control unit;

respective slide resistance having each slider connected on each element to determine a present coordinate of each element, as a potential value representing the distance of the element from the zero point;

a means of initially recording a minimum coordinate value and a maximum coordinate value respectively corresponding to the minimum position and the maximum position of each element which is moved within a respective restricted given range, and the minimum and maximum coordinate values being measured by respective slide resistance;

a means of initially recording minimum and maximum control values to be fed into a control unit for actuating in a start-stop motion, thereby moving each element in a start-stop motion based upon predetermined patterns of movement, within a respective restricted moving range;

a means of determining a percentage or ratio of a present coordinate of each element which is measured by the respective slide resistance, to the restricted range within which each element can move, on the basis of the recorded minimum coordinate value and the maximum coordinate value, and determining a percentage or ratio of the control value representing a desired position of each element, based on each of the predetermined moving patterns, to a range representing a respective restricted range within which each element can move, on the basis of the recorded minimum and maximum control values; and a control unit for feeding drive signals each based on the present coordinate value of each element measured by the slide resistance, the minimum coordinate value and maximum coordinate values as recorded, respectively corresponding to the minimum position and the maximum position for each element, the percentage or ratio of the present coordinate to the moving range as recorded, and the percentage or ratio of the control value representing the desired position of each element to the moving range as recorded, into each of the actuating circuits, such that the percentage or ratio of the present coordinate to the respective moving range should be equal to the percentage or ration of the control value to the moving range, each of actuating circuits for feeding the actuating signals based on the drive signal for the control unit and an alternating current or a pulsed current from a source.

The arrangement for controlling in a start stop motion, e.g., two actuable elements or valves, i.e., a main element and a sub element by a microprocessor or a personal computer includes the following features:

actuating signal currents ranging from 4 mA to 20 mA are converted into a voltage, e.g., the range of 0.8 V to 4.0 V by using a resistance of 200 ohm, and converted into a digital value through an A/D converter.

A potentiometer is mounted on each of elements, i.e., a main element and a sub element to be actuated by a respective motor, which can measure its position as a potential or a voltage, which is converted into digital values through the same A/D converter. The central processing element (CPU) will compare the signal voltage converted from the actuating signal current with the voltage measured by the potentiometer in digital value.

The AC motor is operated by feeding a processed alternating current (AC) to be fed into the AC motor from a source, thereby restricting the number of cycles of the wavelength periods of the AC in a certain duration to be applied to the AC motor, so as to restrict a power to be loaded on the motor. The integral time of one wavelength period of the sine curve of the alternating current is to be applied to the AC motor from a source provided as a maximum power time unit within a certain time, so that the number of wavelengths or cycles of the sine curve in the AC to be applied into the AC motor within the maximum power time unit is determined in accordance with the desired power revolution number (speed) of the AC motor.

Within an interval of a maximum power unit period represented by an integer times one wavelength duration of the sine curve of the alternating current, one cycle of the sine waves is assumed as one digit unit for the adjustment of the power to be applied to the AC motor of the arrangement for actuating in start-stop motion. Because an AC motor has a constant loading from the arrangement for actuating in a startstop motion, the revolution rate of the AC motor can be adjusted only by changing the power applied to the motor. Therefore, a binary signal from the control unit 18 will discontinue or restrict the desired number of the cycles of the AC from the source within the maximum power unit period, so as to adjust or restrict a revolution rate of the AC motor, by a digital controlling manner. Therefore, the revolution numbers (speed) of a plurality of AC motors can be easily changed and adjusted by electric signals, and a binary signal to adjust the revolution number (speed) of AC motors can be transmitted through the same lines to the motors, in which a motor operating signal to adjust the position of the control by feedback operation is transmitted, and therefore, the lines and elements can be easily assembled.

In accordance with the present invention, the position information on the measurement of each element position and the position information on the desired position can be represented by dimensionless or unitless quantities. The ratio of a measured (coordinate) value or a desired (coordinate) value respectively to the differences of the maximum position values and the minimum position values respectively are processed and compared in a dimensionless way. Therefore, the adjustment at the zero point will be necessary for obtaining absolute level.

Further, a gain rate or multiplicity of the signals is compensated, and then, the coincidence of span distance information will be unnecessary. The quantity of the ratio is dimensionless, and then the coincidance of a dimension or unit will be unnecessary. Therefore, initial adjustment of the device will be simplified.

Sequentially, the binary signals (C) discontinue and continue in stepwise manner of one cycle duration of the sine waves in the AC voltage sinusoidal curves in the breaker 19. Therefore, the power to be applied to the AC motor 1 can be controlled or adjusted in step of one cycle duration of the sinusoidal curve. The control element function in this manner may include a semiconductor AC switching element such as a solid state relay (SSR) element.

The binary signals (C) will determine the number of cycles of the sine waves in the AC voltage, included in the maximum power unit period ($T_{max}$), in accordance with the quantities of the control data (C), and the output from the AC breaker circuit is a quantumized power by one cycle unit (digit) of the sinusoidal curve of the AC.

There are provided an AC source 14 and a waveshape regulating circuit 15, an AC motor digital control unit 18, an AC power breaker circuit 19. Further, there are provided control signals S and $S_x$, and the minimum signal value $S_{min}$, the maximum signal value $S_{max}$, the measured position value $P_x$, the measured minimum position value $P_{min}$ and the measured maximum position value $P_{max}$.

Further, there are provided in FIGS. 2 and 3, a photocoupler 16, a converter 17, an AC motor digital control unit 18, an AC power breaker circuit 19 and a switch 20. Then, there are illustrated pulse signals t, one cycle duration $T_1$ of the sine wave of the AC, the maximum power unit time $T_{max}$, an integer N, a control date (C) and a binary signal (C).

The maximum power unit period ($T_{max}$) is preferably a common multiple of the frequencies of the AC power commercially available. For example, in Japan there are two species of the commercial AC powers which have respectively the frequencies of 50 Hz and 60 Hz, the common multiple is 300 milliseconds, being preferably.

The revolution number of the AC motor 1 is proportional to the power applied because of constant loading, and the power applied can be changed stepwise. Because this stepwise change of applied power corresponds to the control data (C), the revolution number of the AC motor 1 can be adjusted or restricted stepwise by feeding the control data (C) into the digital unit 18.

The revolution shaft 2 of the AC motor 1 is connected to a gear reduction shaft 3 which drives the output shaft 4 which rotates the control 7. The control 7 is fixed on a position detector 11*a*, 11*b* which moves directly according to the rotation of the control 7.

The terminal 11*b* slides on a slider resistance of the potentiometer 11. The analog signal $P_x$ detected on the slider enters from a port CH2 into the A/D converter 13 and the converted signal passes into the digital control unit 18.

The AC motor is operated by feedback operation on the basis of the position signal from the converter 13, and the desired value (S1) recorded in the unit 18.

We claim:

1. A system for initiating a plurality of mechanical elements in a machine, comprising:

a plurality of housings, each housing containing a motor controller, a motor electrically coupled to the motor controller, and means for mechanically coupling said motor to one of the mechanical elements, an uncoordinated motion initializing means electrically connected to each of said motor controllers, for instructing said motor controllers to operate the associated motor subsequent to the time an initialization command is received and until the associated mechanical element reaches an initialization position, such that each of said motors moves the associated mechanical element in uncoordinated motion until each mechanical element reaches the associated initialization position, the improvement comprising;

memory means associated with said uncoordinated motion initializing means provided with at least one predetermined pattern relating to the movement of said mechanical elements;

wherein each of said mechanical elements moves in an operating range between an upper limit ($P_{max}$) and a lower limit ($P_{max}$) in accordance with said predetermined operating pattern and further wherein each of said mechanical elements starts from a predetermined starting position and simultaneously reaches a target position moving in a start-stop motion with the other mechanical elements, said memory means further recording an initial potential at $P_{max}$ and $P_{min}$ for each of said mechanical elements;

a slide resistance connected to each of said mechanical elements including a slider generating a potential corresponding to the distance each of said mechanical elements has traveled from said starting position, said potential received by said uncoordinated motion initializing means;

means associated with said uncoordinated motion initializing means for determining the present potential percentage value corresponding to the present potential ($P_x$) measured by said slide resistance for each of said mechanical elements at a shifted position from said predetermined starting position with respect to said target position on the basis of said predetermined operating pattern, said potential percentage value being the ratio of $P_x$ to the difference between $P_{min}$ and $P_{max}$;

wherein each of said motor controllers generates and supplies signals to operate its respective motor in harmony in a start-stop motion in accordance with said predetermined operation pattern between $P_{max}$ and $P_{min}$, and further wherein each of said motor controllers generates a signal to its respective motor to gradually alter said start-stop motion based upon a comparison of said present potential percentage value and an ideal percentage value determined by said predetermined operating pattern.

2. The system for initiating a plurality of mechanical elements, as claimed in claim 1;

wherein said motor is an AC or step motor driven by an alternating or pulsed current.

3. The system for initiating a plurality of mechanical elements, as claimed in claim 1;

wherein said plurality of the mechanical elements are one of the following combination: a fuel valve and an air intake valve for a fuel combustion furnace; a main throttle flap and a sub throttle flap for an air conditioning apparatus, or a main valve and a bypass valve.

4. The system for initiating a plurality of mechanical elements, as claimed in claim 1;

wherein the value of the initiating signals for moving said mechanical element is selected so as to cause said mechanical element to drive at highest torque.

5. The system for initiating a plurality of mechanical elements, as claimed in claim 2;

wherein when the motor is an AC motor, the initiating signals are generated by regulating a wave number of the alternating current to be applied to said AC motor, and said plurality of mechanical elements are a main element and a sub element.

6. The system for initiating a plurality of mechanical elements, as claimed in claim 5;

wherein said comparison of said present potential percentage value at said ideal percentage value ranges between ±1 to 5%.

* * * * *